United States Patent Office 3,450,732
Patented June 17, 1969

3,450,732
PROCESS FOR THE PRODUCTION OF CARBON MONOXIDE-FREE COMPLEX COMPOUNDS OF THE TRANSITION METALS
Gunther Wilke, Ernst Willi Müller, Michael Kroner, Paul Heimbach, and Heinz Breil, Mulheim (Ruhr), Germany, assignors to Studiengesellschaft Kohle, Muehlheim (Ruhr), Germany, a corporation of Germany
No Drawing. Continuation of application Ser. No. 104,221, Apr. 20, 1961. This aplication Aug. 21, 1968, Ser. No. 755,508
Claims priority, application Germany, Apr. 28, 1960, St 16,427
Int. Cl. C07f *11/00, 9/00;* C07c *3/20*
U.S. Cl. 260—429                                16 Claims

ABSTRACT OF THE DISCLOSURE

Carbonyl-free complexes of transition metals of groups I, IV, V, VI and VII and a Lewis base wherein the transition metal has a zero valence and is $\pi$-bonded to the Lewis base, and processes for their preparation. The compounds are catalysts for the dimerization of trimerization of 1-3-diolefins.

---

This application is a continuation of application Ser. No. 104,221, filed Apr. 20, 1961, now abandoned.

This invention relates to the production of novel complexes of the transition metals.

Complexes of transition metals are known in various forms. For example, the simultaneous action of chromium-III-chloride, aluminum chloride and metallic aluminum on benzene at temperatures of about 150° C. and under pressure results in the formation of dibenzene-chromium-I-aluminum tetrachloride which, by subsequent reduction, e.g. by means of nascent hydrogen, can be converted into dibenzene-chromium (nonvalent). This compound represents a typical aromatic complex.

A second known method of producing complexes of this kind comprises reacting and carbonyl compounds of the transition metals with aromatic hydrocarbons at elevated temperatures. By displacement of one or more carbon monoxide molecules, aromatic complexes built analogously to dibenzene chromium or complexes wherein both aromatic systems and CO molecules are bonded to the transition metal are formed in this manner.

It is further known that complexes wherein both olefin molecules and carbon monoxide molecules are bonded to formally nonvalent nickel can be formed from metal carbonyls and olefins, e.g. from nickel tetracarbonyl and cyclooctatriene or from iron pentacarbonyl and cyclooctatetraene.

All of these processes either use very severe reaction conditions which are unsuited for the production of sensitive complexes or they result in complexes in which at least one or several carbon monoxide molecules are linked to the transition metal.

It has now surprisingly been found that transition metal complexes which contain no carbon monoxide groups whatever can be prepared by allowing organometallic compounds of the 1st to 3rd main groups, i.e. groups Ia, IIa, and IIIa, of the Periodic Table to act on compounds of the transition metals in the presence of electron donators under very mild conditions. Particularly readily obtained in accordance with the invention are complex compounds of metals of groups I, IV, V, VI, and VII of the Periodic Table.

Suitable electron donators include compounds which either contain C—C multiple bonds such as, for example, C=C or C≡C linkages, or groups of atoms with non-linking electron pairs. Especially cyclic olefins, conjugated olefins, acetylenes, diketones, alkyl and aryl compounds of Group V–A of the Period Table are effective as complex formers of this kind.

Preferred transition metals are vanadium, chromium and manganese.

Transition metal compounds which may be used include those which either contain inorganic or organic radicals as anions. Particularly advantageous is the use of compounds which are soluble in the systems used as solvents. This is particularly true for transition metal compounds with inorganic or organic radicals such as acetyl acetonates, acetoacetic ester enolates, alcoholates, salts of weak organic acids or of inorganic acids or dimethyl glyoxime compounds.

The organometallic compounds used according to the invention include alkyl, cycloalkyl, aryl or aralkyl compounds of the metals of main groups I to III, i.e. groups Ia, IIa, and IIIa, such as lithium butyl, zinc diethyl, ethyl- or phenyl-magnesium halides and especially aluminum trialkyls or alkoxy aluminum alkyls.

The complexes are prepared by mixing the compounds of the transition metals either as a suspension or as a solution in appropriate solvent with the electron donator component and adding to this mixture the metal alkyl component. The heat of reaction which is possibly evolved is removed by cooling. Upon completion of the reaction, the complex compounds formed are separated from the by-products either by washing with water or dilute acid or by distillation, sublimation or crystallization. Aliphatic, alicyclic or aromatic hydrocarbons such as hexane, cyclohexane or benzene were found to be suitable solvents for these reactions. However, ethers including open chain or cyclic ethers may be used with equally good success. The particular reaction temperatures used depend upon the stability of the compounds obtained as complexes. In general, temperatures of between −80° and +100° C. and preferably between −40° and +5° C. have been found to be suited.

The particular advantage of the process of the invention resides in the fact that it is possible under very mild conditions to produce complex compounds of the transition metals which cannot be obtained by previously known or described processes because either the reaction conditions of the processes mentioned are excessively severe for the preparation of sensitive complex compounds or, especially in the conversion of metal carbonyls, not all of the CO groups can be displaced by electron donator molecules to be freshly introduced.

The new complex compounds of transition metals obtainable in accordance with the invention are without exception active catalysts for the dimerization or trimerization of 1,3-diolefins and are of great commercial interest.

The invention is illustrated in the following examples wherein the term "(0)" is intended to mean "nonvalent."

Example 1

The procedure is the same as in Example 10.

1 gm. of Cr-acetylacetonate, 9 gms. of triphenylphosphine, 70 ml. of absolute benzene, 27 ml. of ethoxydiethyl aluminum containing 422 mg./ml. give a red complex solution which polymerizes butadiene in addition to small amounts of 3-methyl-heptatriene. Aluminum can be washed out of the benzenic complex solution with 5 N HCl. The chromium remains in the organic phase and is obtained as a black-brown amorphous organic compound after evaporation of the solution.

Example 2

1 gm. of vanadium acetylacetonate, 12.8 gms. of triphenylphosphine, 65 ml. of absolute benzene, 35 ml. of ethoxy-diethyl aluminum solution containing 422 mg./ml. give a brown complex solution which polymerizes butadiene.

Example 3

0.4 gms. of vanadyl acetylacetonate and 0.72 gms. of alpha-alpha'-dipyridyl are dissolved in 25 ml. of absolute benzene and reduced with 2 ml. of ethoxy-diethyl aluminum while cooling with ice. This results in the formation of a dark violet solution of a vanadium complex which is capable of polymerizing butadiene.

Example 4

35 ml. of cyclooctatetraene and 28 ml. of aluminum triethyl are dissolved in 100 ml. of absolute benzene. Then 8.5 ml. of titanium tetrabutylate dissolved in 25 ml. of absolute benzene are added at 80° C. within 2 hours. The mixture is stirred for additional 15 hours at 80° C. After cooling, the crystals formed are separated. Black crystals having metallic lustre and corresponding to the composition of $Ti_2(C_8H_8)_4$ are obtained in a yield of 5.5 gms. corresponding to 85% of the theoretical.

Example 5

The procedure is the same as in Example 4 except that 50 ml. of benzene, 3.3 ml. of cyclooctatetraene, 17 ml. of aluminum triethyl, and 4.2 ml. of titanium tetrabutylate dissolved in 12.5 ml. of benzene are used. There are obtained 1.8 gms.=70% of the theory of fine yellow crystals, the composition of which corresponds to the formula $Ti_2(C_8H_8)_3$.

Example 6

To 2.7 gms. of the complex prepared in Example 5 are added 50 ml. of cyclooctatetraene and the mixture is heated at 80° C. for 45 hours while stirring. There are obtained 2.45 gms.=73% of the theory of the complex described in Example 4.

Example 7

3.73 gms. of Cu-II-acetylacetonate and 7.5 gms. of triphenylphosphine are suspended in 100 ml. of absolute benzene. The suspension is reduced with 1.09 ml. of ethoxy-diethyl aluminum. After about 4 hours, a clear light yellow complex solution is obtained. The benzene is distilled off in vacuo and the residue is mixed with 100 ml. of absolute ether. A white powder which is practically insoluble in ether and the composition of which corresponds to the formula $$Cu(C_5H_7O_2)(P(C_6H_5)_3)_2$$

is obtained in a yield of 8.8 gms. corresponding to 90% of the theoretical.

Example 8

4.08 gms. of anhydrous Mn-II-acetylacetonate are suspended in 50 ml. of absolute benzene, mixed with 10 ml. of cyclooctatetraene and reduced with 4.5 ml. of aluminum triethyl. A pyrophoric powder the composition of which corresponds to the formula $Mn_2(C_8H_8)_3$ precipitates immediately in a yield of 3.23 gms. corresponding to 95% of the theoretical.

What is claimed is:

1. Process for the production of carbon monoxide-free complex compounds of the transition metals of Groups I, IV, V, VI, and VII of the Periodic Table with at least one electron donor wherein the transition metal is in neutral, non-valent form, which comprises contacting an organometallic compound selected from the group consisting of alkyl-, cycloalkyl-, aryl-, and aralkyl-compounds of the metals of Groups Ia, IIa, and IIIa of the Periodic Table and zinc, with a compound of a transition metal having an anion selected from the group consisting of inorganic and organic radicals, in the presence of an electron donor selected from the group consisting of alkyl-, and aryl-compounds of metals of Group Va of the Periodic Table, multiple cyclic olefins, diketones, and mixtures thereof, and recovering the complex product formed.

2. Process according to claim 1, wherein said transition metal is selected from the group consisting of chromium, canadium, titanium, copper and manganese.

3. Process according to claim 2 wherein the contacting is effected in the presence of a solvent selected from the group consisting of aliphatic-, alicyclic-, and aromatic-hydrocarbons, and open chain-, and cyclic-ethers.

4. Process according to claim 3, wherein the transition metal compound used is soluble in the solvent.

5. Process according to claim 4, wherein the transition metal compound is dissolved in the solvent, then mixed with the electron donor, and the organometallic compound is thereafter added to the resulting mixture.

6. Process according to claim 3, wherein the transition metal compound used is insoluble in the solvent, said transition metal compound being suspended in said solvent, then mixed with the electron donor, and the organometallic compound thereafter being added to the resulting mixture.

7. Process according to claim 3, wherein the temperature is maintained between about −80 and +100° C.

8. Process according to claim 7, wherein the temperature is maintained between about −40 and +5° C.

9. Carbon monoxide-free complex compounds of the transition metals of groups I, IV, V, VI, and VII of the Periodic Table with at least one electron donor in which the transition metal is in neutral, non-valent form, and in which the complexing component is selected from the group consisting of alkyl-, and aryl-compounds of metals of Group Va of the Periodic Table, multiple cyclic olefins, diketones, and mixtures thereof.

10. Carbon monoxide-free complex compound of a transition metal selected from the group consisting of chromium, vanadium, titanium, copper and manganese, with at least one electron donor in which the transition metal is in neutral, non-valent form, and in which the complexing component is selected from the group consisting of alkyl-, and aryl-compounds of metals of Group Va of the Periodic Table, multiple cyclic olefins, diketones, and mixtures thereof.

11. Carbon monoxide-free complex compound of the transition metal chromium and triphenyl phosphine in which said chormium is in neutral, non-valent form, prepared by contacting chromium acetyl acetonate dissolved in benzene with triphenylphosphine, and reducing the resulting mixture with ethoxy diethyl aluminum to form a red complex.

12. Carbon monoxide-free complex compound of the transition metal chromium and triphenyl phosphine in which said chromium is in neutral, non-valent form, prepared by contacting chromium acetyl acetonate dissolved in benzene with triphenylphosphine, reducing and simultaneously cooling the resulting mixture with ethoxy diethyl aluminum, thereafter extracting the aluminum from the benzenic complex formed by adding mineral acid, and recovering the black-brown chromium complex from the resulting organic phase.

13. Carbon monoxide-free complex compound of the transition metal vanadium and triphenyl phosphine, in which said vanadium is in neutral, non-valent form, prepared by contacting vanadium acetyl acetonate dissolved in benzene with triphenylphosphine, and reducing the resulting mixture with ethoxy diethyl aluminum to form a brown complex.

14. As a novel complex compound, $Ti_2(C_8H_8)_4$ in the form of black crystals having metallic lustre.

15. As a novel complex compound, $Ti_2(C_8H_8)_3$ in the form of fine yellow crystals.

16. As a novel complex compound, $Mn_2(C_8H_8)_3$ in the form of a rust-brown powder.

References Cited

UNITED STATES PATENTS 3,231,593  1/1966  Hafner et al. _____ 260—429

OTHER REFERENCES

Herzog, Naturwissenschaften, 43 (1956), p. 35.

TOBIAS E. LEVOW, *Primary Examiner.*

A. P. DEMERS, *Assistant Examiner.*

U.S. Cl. X.R.

252—431; 260—94.3, 429.5, 438.1, 438.5, 666